United States Patent [19]

Hayakawa

[11] Patent Number: 4,633,340

[45] Date of Patent: Dec. 30, 1986

[54] MAGNETIC RECORDING AND REPRODUCING APPARATUS WITH MEANS FOR INCREASING AMOUNT OF INFORMATION TO BE STORED IN A MAGNETIC MEMORY DISK

[75] Inventor: Yuji Hayakawa, Nagoya, Japan

[73] Assignee: Brother Kogyo Kabushiki Kaisha, Japan

[21] Appl. No.: 797,865

[22] Filed: Nov. 14, 1985

[30] Foreign Application Priority Data

Nov. 19, 1984 [JP] Japan .................................. 59-243583

[51] Int. Cl.⁴ ........................................... G11B 5/012
[52] U.S. Cl. ...................................................... 360/69
[58] Field of Search ........................ 360/69, 71, 73, 75

[56] References Cited

FOREIGN PATENT DOCUMENTS

54-47446  4/1979  Japan ..................................... 360/71

*Primary Examiner*—George G. Stellar
*Attorney, Agent, or Firm*—Parkhurst & Oliff

[57] ABSTRACT

A boosted-capacity magnetic recording and reproducing apparatus compatible with a host device to which is connectable a standard-capacity magnetic recording and reproducing apparatus wherein first annular recording tracks on a first magnetic disk are identified with respective serial track numbers designated by the host device, the boosted-capacity apparatus comprising: a second magnetic disk having second annular recording tracks each of which is equally divided into a plurality of sectoral tracks identified with respective sectoral track numbers which are equal to the serial track numbers; a disc drive for rotating the first disk at a speed equal to a rotating speed of the first disk divided by the number of division of each second annular track; a magnetic head; a detector generating an indexing signal when each of boundaries between the sectoral tracks passes a predetermined position during rotation of the second disk; a positioning device for positioning the magnetic head on one of the second annular tracks which includes the selected sectoral track identified with the sectoral track number equal to the serial track number designated by the host device; and a controller for recording or reproducing information on or from the selected sectoral track, based on the indexing signal.

9 Claims, 7 Drawing Figures

S2: N = ODD NUMBER OR EVEN NUMBER?
S3: S = ODD NUMBER OR EVEN NUMBER?
S5: S = ODD NUMBER OR EVEN NUMBER?

FIG. 6

MAGNETIC RECORDING AND REPRODUCING APPARATUS WITH MEANS FOR INCREASING AMOUNT OF INFORMATION TO BE STORED IN A MAGNETIC MEMORY DISK

BACKGROUND OF THE INVENTION

1. Field of the Art

The present invention relates generally to a magnetic information recording and reproducing apparatus, and more particularly to means that enables a magnetic storage disk to store an increased amount of information.

2. Related Art Statement

A magnetic recording and reproducing apparatus is known, which comprises a magnetic disk having a multiplicity of annular recording tracks concentric with the axis of rotation, a disk drive for rotating the magnetic disk about its rotating axis, a magnetic head for writing and reading information on or from the magnetic disk, a head positioning device for positioning the magnetic head on a selected one of the annular recording tracks of the magnetic disk, and a read/write controller for controlling the information recording and reproducing operations on or from the recording tracks of the magnetic disk through the magnetic head. The annular recording tracks provided on the magnetic disk are identified with respective serial track numbers which are designated by a host device or system to which the apparatus is connected for interactive data communication. Upon designation of a serial track number by the host device to select the corresponding annular recording track on the magnetic disk, the head positioning device is activated to move the magnetic head in the radial direction of the magnetic disk, so that the magnetic head is positioned on the corresponding annular recording track for effecting information recording or reproduction on or from the designated annular recording track.

There has been a desire to increase the storage capacity of a magnetic disk. As one means to meet this desire, it has been attempted to increase the total number of bits that are stored on each annular recording track of the memory disk.

PROBLEM SOLVED BY THE INVENTION

However, an increase in the number of bits on each recording track of the magnetic disk results in a need of increasing the speed at which information is transferred to and from the recording track. For example, a common magnetic recording and reproducing apparatus is designed to rotate the magnetic disk at 3600 rpm, to effect information transfer at a rate of 5 MBit/sec. It will be obvious that the amount of information that is read or written during one rotation of the magnetic disk is increased as the number of bits per recording track is increased. To increase the rate of information transfer, the host device to which the recording and reproducing apparatus is connected should be modified in both software and hardware. This requirement of modification of the host device is a problem which has been experienced in the art.

SUMMARY OF THE INVENTION

It is accordingly an object of the present invention to provide a boosted-capacity magnetic recording and reproducing apparatus which enables a magnetic disk to store an increased amount of information, without having to modify a host device or the magnetic disk.

According to the present invention, there is provided a boosted-capacity magnetic recording and reproducing apparatus, in which the number of bits that are stored on each annular recording track of a magnetic disk is increased to a multiple of the number of bits that are stored on a magnetic disk in an ordinary magnetic recording and reproducing apparatus. At the same time, the rotating speed of the magnetic disk in the instant apparatus is reduced in reverse proportion to the multiple of increase in the number of bits per annular recording track. The instant apparatus makes it possible to achieve information recording and reproduction by changing an arrangement for controlling the recording and reproducing operations, but without requiring any modifications of a host device to which the apparatus is connected for data transfer therebetween. Thus, for the host device, the instant magnetic recording and reproducing apparatus operates in the same manner as an ordinary apparatus as if no provisions were made in its control arrangement.

Stated more specifically, there is provided according to the invention a boosted-capacity magnetic recording and reproducing apparatus compatible with a host device to which is connectable a standard-capacity magnetic recording and reproducing apparatus which includes: a first magnetic disk having a multiplicity of first annular recording tracks which are concentric with an axis of rotation of the disk and which are identified with respective serial track numbers; a first disk drive for rotating the first magnetic disk about its axis of rotation at a first rate; a first magnetic head; a first head positioning device for moving the first magnetic head radially of the first magnetic disk to position the first magnetic head on a selected one of the first annular recording tracks which is identified with the corresponding serial number designated by the host device; and first control means for recording or reproducing information on or from the selected recording track through the magnetic head after the magnetic head is positioned at the selected recording track, the boosted-capacity recording and reproducing apparatus comprising: a second magnetic disk having a multiplicity of second annular recording tracks each of which is equally divided into a plurality of sectoral recording tracks which are identified with respective sectoral track numbers which are equal to the serial track numbers; a second disk drive for rotating the second magnetic disk at a second rate which is equal to the first rate divided by the number of division of each of the second annular recording tracls; a second magnetic head; indexing means for detecting the sectoral recording tracks of the second magnetic disk, the indexing means generating an indexing signal when each of boundaries between the sectoral recording tracks adjacent to each other in a circumferential direction of the second magnetic disk passes a predetermined position during each rotation of the second magnetic disk; a second positioning device for moving the second magnetic head radially of the second magnetic disk to position the second magnetic head on one of the second annular recording tracks which includes the sectoral recording track identified with one of the sectoral track numbers which is equal to the serial track number designated by the host device; and second control means, responsive to the indexing signal, for recording or reproducing information on or from the sectoral recording track identified with the sectoral track number equal to the serial track number designated by the host device.

In the boosted-capacity magnetic recording and reproducing apparatus of the invention constructed a described above, the second rate at which the second magnetic disk is rotated is reduced to a fraction of the first rate of the first magnetic disk in the standard-capacity apparatus, namely, the second rate is equal to the first rate divided by the number of division of each second annular recording track into the sectoral recording tracks. Consequently, the amount of information that can be stored on each second annular recording track of the second magnetic disk of the instant apparatus is increased to a multiple of that of the first magnetic disk, which multiple is equal to the number of division of the second annular tracks. Yet, it is not necessary to increase the rate at which information is transferred between the instant apparatus and the host device.

Upon designation of a certain serial number track by the host device for information recording or reproduction on or from the recording track (sectoral recording track of the second magnetic disk) identified with the designated serial number track, the positioning device is activated to move the magnetic head to one of the second annular recording tracks which includes the sectoral recording track identified with the sectoral track number equal to the designated serial track number. With the magnetic head positioned on this second annular recording track, the indexing signal is generated during rotation of the second magnetic disk, at the moment when each of the boundaries between the sectoral recording tracks passes the second magnetic head. Based on this indexing signal, it is possible to find the sectoral recording track identified with the sectoral track number equal to the serial track number designated by the host device. Thus, the instant magnetic recording and reproducing apparatus is capable of effecting information recording or reproduction on or from the designated sectoral recording track, without a recording or reproducing operation on or from the other sectoral recording track or tracks of the same second annular recording track.

It will be understood from the foregoing description that the host device is operated in the same manner as in a recording or reproducing operation on or from an ordinary or standard-capacity magnetic recording and reproducing apparatus in which the annular recording tracks of a magnetic disk are not divided into sectoral recording tracks, and in which only one indexing signal is generated per rotation of the magnetic disk. The magnetic recording and reproducing apparatus according to the present invention enables a standard magnetic disk to provide a storage capacity at least two times as large as that in an ordinary known apparatus, provided that the size of the magnetic disk is the same. Further, the instant apparatus is compatible with the host device to which such an ordinary magnetic recording and reproducing apparatus is connectable. In other words, the host device is interchangeably connectable to the instant apparatus and to the ordinary apparatus, without any hardware or software modifications for interchangeable or selective connection with these two different types of apparatus.

According to one advantageous embodiment of the invention, the indexing means generates a primary indexing signal and at least one secondary indexing signal during each rotation of the second magnetic disk, the primary indexing signal representing a reference angular position of the second magnetic disk. The second control means are responsive to the primary indexing signal and the at least one secondary indexing signal, to detect the sectoral recording track identified with the one of the sectoral track numbers.

According to another advantageous embodiment of the invention, the second positioning device comprises a microcomputer which, upon designation of another serial track number by the host device, calculates the number of the second annular recording tracks of the second magnetic disk, as counted from the second annular track which includes the sectoral recording track currently identified with the above-indicated one of the sectoral track numbers, to the second annular track which includes the sectoral recording track which is identified next with another sectoral track number equal to the above-indicated another serial track number.

According to a further advantageous embodiment of the invention, the indexing means generates a primary indexing signal and at least one secondary indexing signal for each rotation of the second magnetic disk, the primary indexing signal representing a reference angular position of the second magnetic disk. The second control means are responsive to the primary indexing signal and the at least one secondary indexing signal, to detect the sectoral recording track identified with the above-indicated one of the sectoral track numbers. The second positioning device comprises a microcomputer which, upon designation of another serial track number by the host device, calculates the number of the second annular recording tracks of the second magnetic disk, as counted from the second annular track which includes the sectoral recording track currently identified with the above-indicated one of the sectoral track numbers, to the second annualr track which includes the sectoral recording track which is identified next with another sectoral track number equal to the above-indicated another serial track number.

In accordance with a still further advantageous embodiment of the invention, each second annular recording track of the second magnetic disk is equally divided into two sectoral recording tracks, and the indexing means comprises first indexing means including an indexing portion rotated together with the second magnetic disk, and an indexing sensor which generates a primary indexing signal upon detection of the indexing portion. The indexing means further comprises second indexing means including a timer which measures a time necessary for the second magnetic disk to rotate by a half turn after the generation of the primary indexing signal. The timer generates a secondary indexing signal when the time has lapsed.

According to yet another advantageous embodiment of the invention, each second annular recording track of the second magnetic disk is equally divided into two sectoral recording tracks, and the indexing means comprises: an indexing portion which is rotated together with the second magnetic disk; and indexing sensor which generates a detection signal upon detection of the indexing portion; a time-interval counter which starts counting the number of clock pulses when the detection signal is generated, and which generates a time-out signal when a count thereof has reached a predetermined number which corresponds to a half turn of the second magnetic disk; a mono-multivibrator connected to the indexing sensor and the time-interval counter, and applying, as the indexing signal, a pulse signal of a predetermined pulse width to the second control means, when the mono-multivibrator receives each of the detection signal and the time-out signal; and means for applying another pulse signal to the second control means when the detection signal is generated, the second control means judging that the indexing signal received together with the another pulse signal is a primary indexing signal which represents a reference angular position of the second magnetic disk.

In accordance with a still further advantageous embodiment of the invention, each second annular recording track of the second magnetic disk is equally divided into two sectoral recording tracks, and the second control means comprises: a microprocessor; a gate circuit connected between the microprocessor and the second magnetic head; and means for producing a first odd-even signal which has different signal levels depending upon whether the sectoral track number of the sectoral recording track on which the second magnetic head is currently positioned is odd or even. The microprocessor generates a second odd-even signal which has different signal levels depending upon whether the serial track number designated by the host device is odd or even. The gate circuit is open when both of the sectoral track number and the serial track number represented by the first and second odd-even signals are odd or even.

In a preferred form of the above embodiment, the microprocessor permits magnetic recording or reproduction of information during a time duration between a moment when the indexing means generates the indexing signal indicative of a beginning of the sectoral recording track identified with the above-indicated one of the sectoral track numbers which is equal to the serial track number designated by the host device, and a moment when the indexing means generates the next indexing signal. In this case, the indexing means may be adapted to generate one primary indexing signal and one secondary indexing signal during each rotation of the second magnetic disk, the primary indexing signal indicating a beginning of one of the two sectoral recording track of the each second annular recording track, and the secondary indexing signal indicating a beginning of the other of the two sectoral recording tracks. The microprocessor is responsive to the primary and secondary indexing signals to judge whether the second magnetic head is currently positioned on the sectoral recording track identified with the above-indicated one of the sectoral track numbers.

BRIEF DESCRIPTION OF THE DRAWING

The foregoing and other objects, features and advantages of the invention will become more apparent from reading the following detailed description of a preferred embodiment of the invention, when considered in connection with the accompanying drawings, in which.

DETAILED DESCRIPTION OF THE PREFERRED EMBODIMENT

Figure 2:
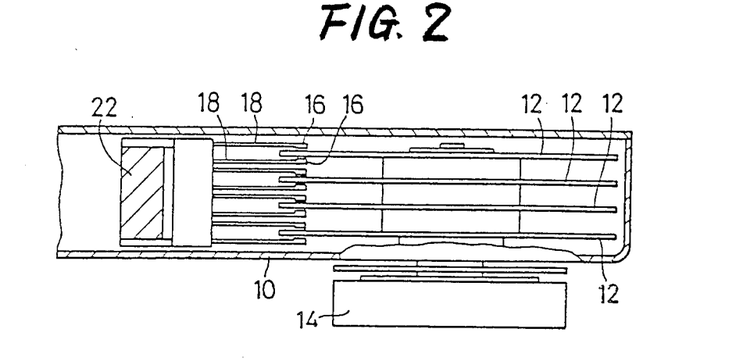
FIG. 2 is a fragmentary front elevational view in cross section of the magnetic recording and reproducing apparatus.
Figure 3:
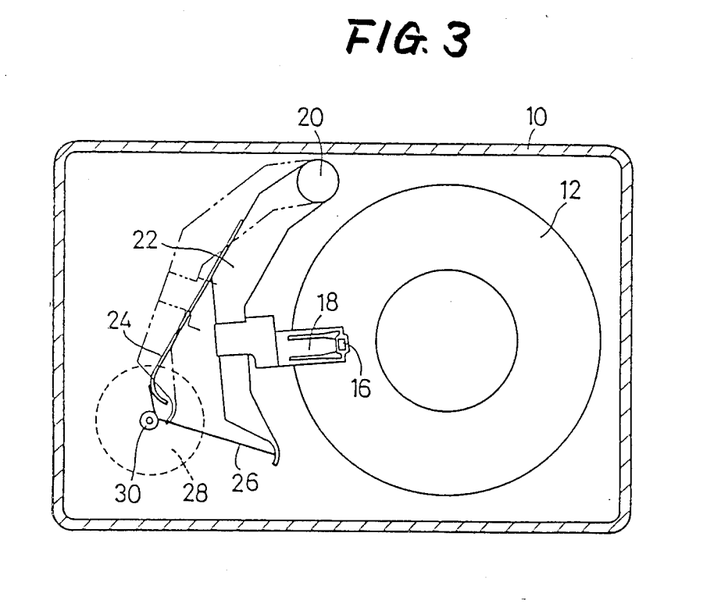
FIG. 3 is a plan view partly in cross section of the apparatus.

Referring to FIGS. 2 and 3, there is shown a mechanical arrangement of one embodiment of a magnetic recording and reproducing apparatus of the present invention. In the figures, reference number 10 designates a casing which accommodates a plurality of magnetic disks 12 which are disposed in concentric relation with each other and spaced from each other by a suitable distance along their axes of rotation. The magnetic disks 12 are rotated all together by a spindle motor 14 which serves as a disk drive. A plurality of magnetic heads 16 are disposed such that they are positioned opposite to opposite surfaces of the magnetic disks 12. The magnetic heads 16 are supported by respective brackets 18 which are fixed to respective swing arms 22. The swing arms 22 are supported pivotally about a shaft 22. Each swing arm 22 is provided with a sheet spring 24. A pulley 30 is secured to an output shaft of a head feed motor 28. A steel band is wound on the pulley 30 such that their arms extending from the pulley 30 engage the sheet spring 24 and the swing arm 22, respectively. In this condition, the sheet spring 24 is elastically deformed, and an elastic force of the sheet spring 24 gives the steel band 26 a tension which causes the steel band 26 to grip the pulley 30. With the head feed motor 28 operated, the swing arm 22 is pivotally moved, whereby the corresponding magnetic head 16 may be moved in a substantially radial direction of the magnetic disk 12.

Figure 4:
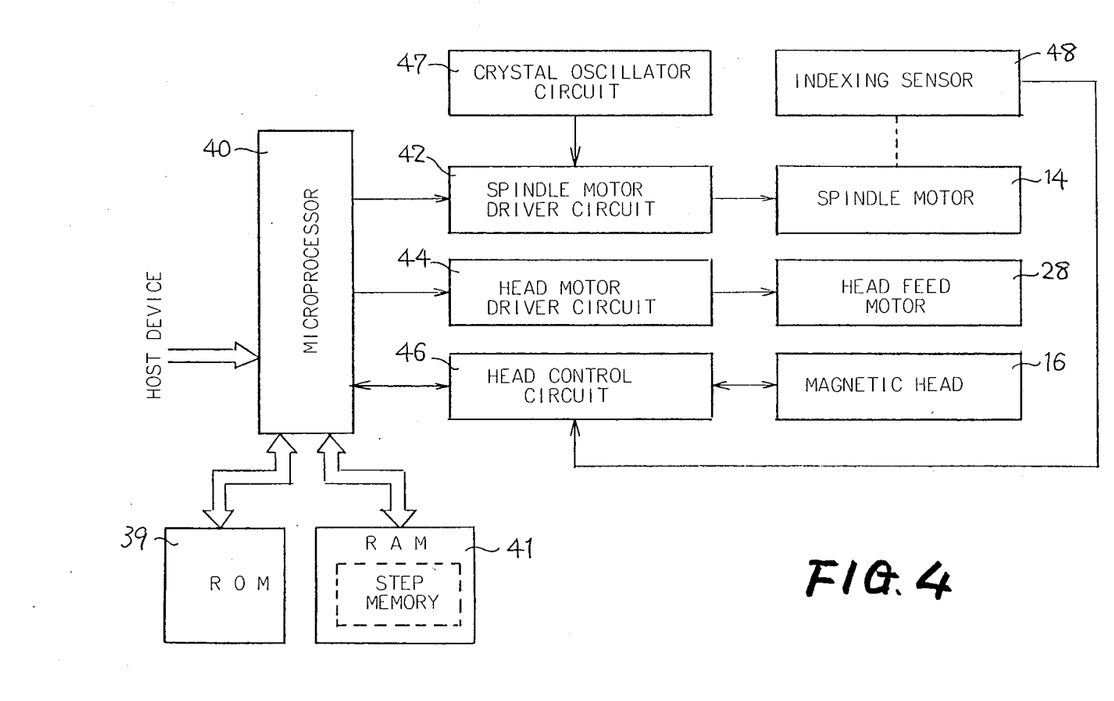
FIG. 4 is a schematic block diagram illustrating a control system of the apparatus.

A control system for controlling the operations of the spindle motor 14, magnetic head 16 and head feed motor 28 is illustrated in FIG. 4. In the figure, reference numeral 40 indicates a microproceesor which acts as a major element of the control system. To the microprocessor 40 are connected a ROM 39 which is a read-only memory, and a RAM 41 which is a random-access memory. The spindle motor 14, head feed motor 28 and magnetic heads 16 are connected to the microprocessor 40 via a spindle motor driver circuit 42, a head motor driver circuit 44, and a head control circuit 46, respectively.

The spindle motor driver circuit 42 drives the spindle motor 14 at 1800 rpm, based on clock pulses which are obtained by dividing the frequency of an output signal from a crystal oscillator incorporated in a crystal oscillator circuit 47. The spindle motor 14 is equipped at its stator with an indexing sensor 48, and at its rotor with an indexing portion. The indexing sensor 48 generates a pulse signal each time the indexing portion of the rotor passes the indexing sensor 48. This pulse signal is applied to the head control circuit 46.

Figure 1:
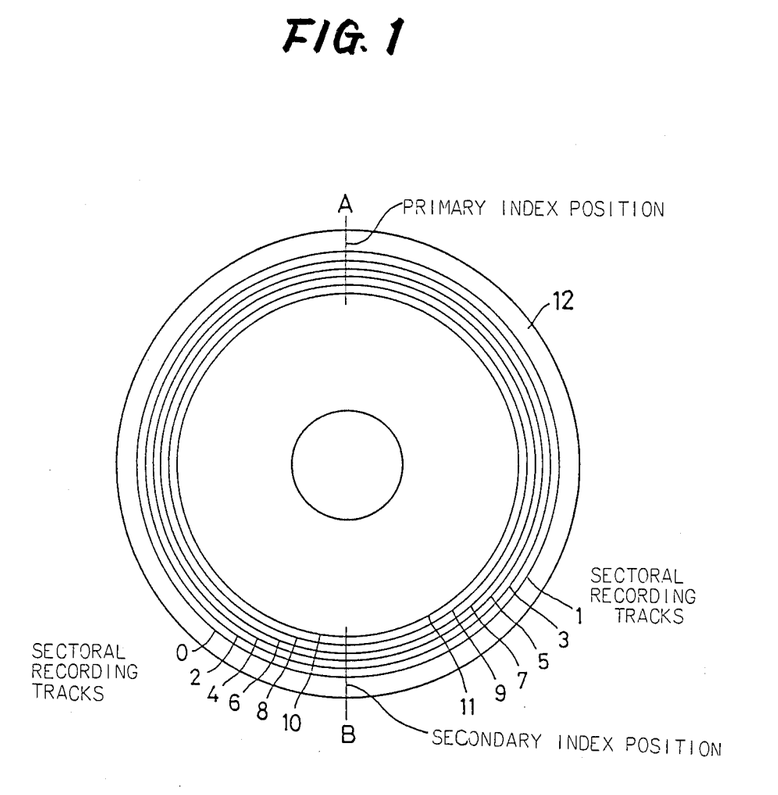
FIG. 1 is a schematic view showing sectoral recording tracks of a magnetic disk of a magnetic recording and reproducing apparatus embodying the present invention.
Figure 5:
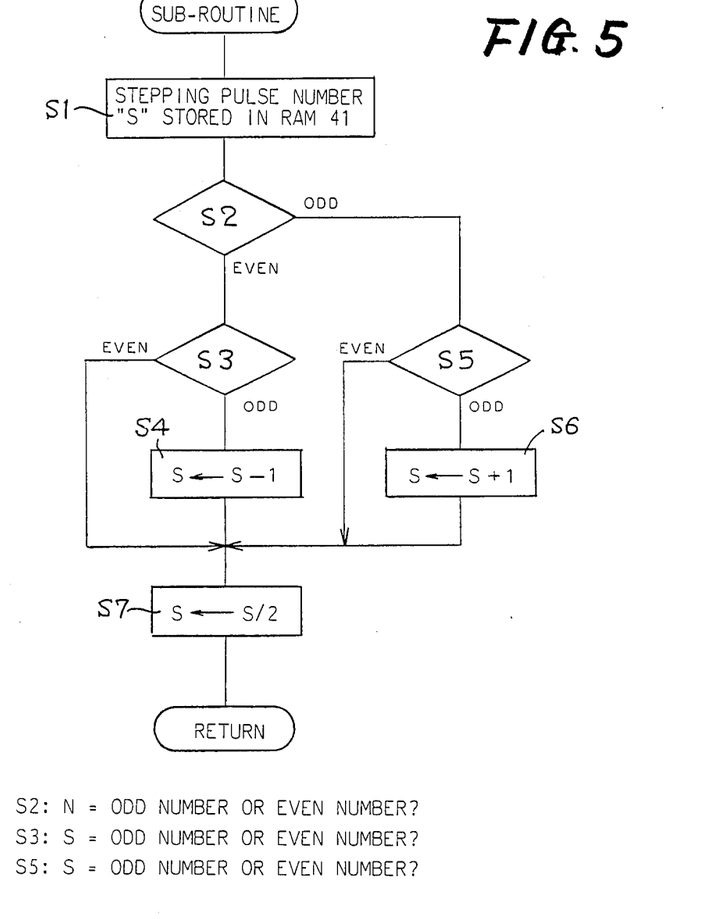
FIG. 5 is a flow chart showing a control program stored in a memory of a microprocessor shown in FIG. 4.

Each of the magnetic disks 12 has a multiplicity of annular recording tracks which are concentric with respect to its axis of rotation, as shown in FIG. 1. Each of the annular recording tracks is equally divided into two sectoral or sectorial recording tracks. The boundaries of the two sectoral recording tracks are indicated at A and B in FIG. 1. The sectoral recording tracks in a left half of the magnetic disk 12 (as seen in FIG. 1) are identified with even sectoral track numbers which increase in a radially inward direction of the disk 12. Similary, the sectoral recording tracks in a right half of the magnetic disk 12 are identified with dd sectoral track numbers. In the meantime, the microprocessor 40 includes a memory which stores a control program for controlling the instant magnetic recording and reproducing apparatus. This program includes a sub-routine as illustrated in FIG. 5. By executing this sub-routine, the microprocessor 40 calculates the number of stepping pulses to be applied to the head motor driver circuit 44 in order to position the magnetic head 16 on one of the annular recording tracks which includes the sectoral recording track identified with a track number which is designated by a host device. In this connection, it is noted that the magnetic recording and reproducing apparatus is connected to and compatible with the host device via the microprocessor 40, as indicated in FIG. 4, for interactive data communication. The host device is compatible with an ordinary magnetic recording and reproducing apparatus wherein annular recording tracks of a mgnetic disk are identified or selected with respective serial track numbers designated by signals from the host device. The manner of positioning the magnetic head 16 on the selected sectoral recording track will be described in detail.

Figure 6:
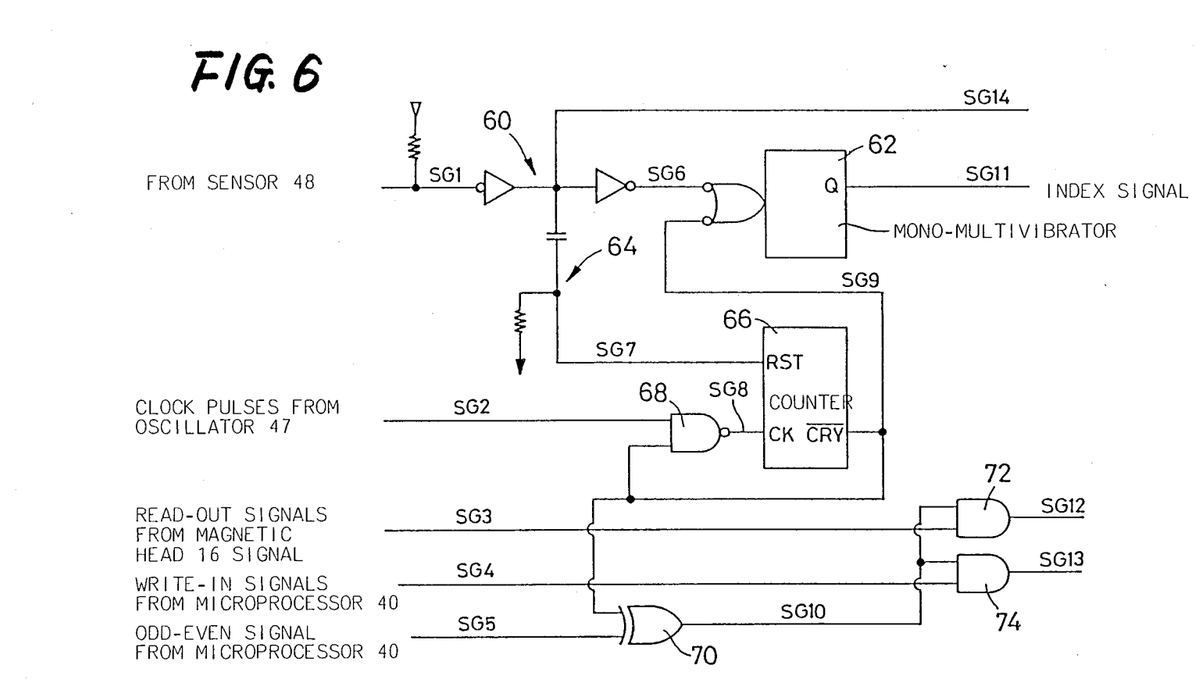
FIG. 6 is a diagram showing in detail a control circuit for controlling a magnetic head of the apparatus.
Figure 7:
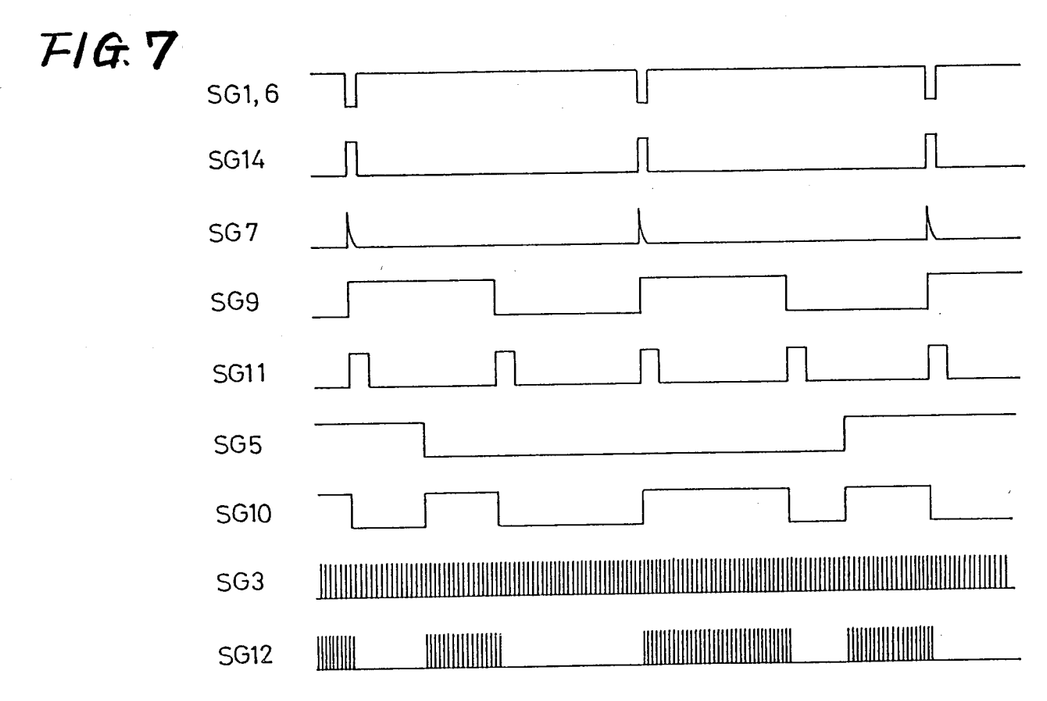
FIG. 7 is a timing chart illustrating the operation of the control circuit of FIG. 6.

The head control circuit 46 is illustrated in detail in a diagram of FIG. 6, and its operation is depicted in a flow chart of FIG. 7. In FIG. 6, reference characters SG1 desigante an output signal of the indexing sensor 48, whose waveform is shaped into a signal SG6 by a shaping circuit 60. This signal SG6 is applied to a mono-multivibrator 62. A differential circuit 64 is provided, which is adapted to receive a signal obtained between two inverters of the waveform shaping circuit 60. An output signal SG7 from the differential circuit 64 is applied to a reset terminal RST of a counter 66. In the meantime, the clock pulses SG2 from the crystal oscillator circuit 47 are applied to a clock terminal CK of the counter 66 via an AND gate 68, which is opened and closed based on an output signal SG9 from a carry-bar terminal $\overline{CRY}$ of the counter 66. This output signal SG9 is also applied to the previously indicated mono-multivibrator 62. the mono-multivibrator 62 applies to the microprocessor 40 a pulse signal of a predetermined with in the form of an INDEXING signal SG11, in response to a fall of the output signal SG9 from the counter 66, and to a fall of the output signal SG6 from the shaping circuit 60, as illustrated in a timing chart of FIG. 7. The microprocessor 40 also receives a signal SG14 which is obtained between the two invertere of the shaping circuit 60. The microprocessor 40 judges whether the signal SG14 has a high or low level at the moment of reception of the INDEXING signal 11, and thus judges whether the INDEXING signal SG11 currently received is a primary indexing signal derived from the signal SG1 from the indexing sensor 48, or a secondary indexing signal derived from the output signal SG9 from the counter 66.

The output signal SG9 from the terminal $\overline{CRY}$ of the counter 66 is also applied to an EXCLUSIVE-OR gate 70. The EXCLUSIVE-OR gate 70 also receives an ODD-EVEN signal SG5 generated from the microprocessor 40, which signal SG5 has a high or low level depending upon whether the serial track number designated by the host devices is odd or even. An output signal SG10 from the EXCLUSIVE-OR gate 70 is applied to an AND gate 72 and to an AND gate 74, so that these AND gates 72, 74 are opened and closed based on the output signal SG10. The AND gate 72 controls a transfer of read-out signals SG3 (for reproduction of information) from the magnetic head 16 to the microprocessor 40, and a transfer of write-in signals SG4 (to be recorded on magnetic disk 12) from the microprocessor 40 to the magnetic head 16. Since the output signal SG10 from the EXCLUSIVE-OR gate 70 has a high level when the low/high level of the output signal SG9 from the counter 66 is not in conformity with the low/high level of the ODD-EVEN signal SG5 from the microprocessor 40, the AND gates 72, 74 are held open while the odd-numbered sectoral recording track of an annular track passes the magnetic head 16 if the level of the ODD-EVEN signal SG5 is high, or while the even-numbered sectoral recording track of the annular track passes the magnetic head 16 if the level of the ODD-EVEN signal SG5 is low. Thus, the desired information may be read out or written on the desired odd-numbered or even-numbered sectoral recording track of each annular track of the magnetic disk 12.

As is apparent from the foregoing description, the indexing sensor 48, indexing portion provided on the rotor of the spindle motor 14, waveform shaping circuit 60 and mono-multivibrator 62 constitute first indexing means which generates the previously indicated primary indexing signal which indicates a reference angular position (indicaetd at A in FIG. 1) of the magnetic disk 12, or indicates the beginning of one of the two sectoral recording tracks of each annular recording track on the disk 12. Further, the differential circuit 64, counter 66, AND gate 68 and mono-multivibrator 62 constitute second indexing means which generates the previously indicated secondary indexing signal which indicates the beginning of the other of the two sectoral recording tracks of the annular recording track (indicated at B in FIG. 1). These first and second indexing means form indexing means which generates the previously described INDEXING signal SG11 when each of the boundaries A and B between the two sectoral recording tracks passes a predetermined position, whereby the two sectoral recording tracks may be detected. Further, the microprocessor 40 adapted to generate the ODD-EVEN signal SG5 and receive the INDEXING signal SG11 and the signal SG14, cooperates with the counter 66, EXCLUSIVE-OR gate 70, and AND gates 72, 74 to constitute a major part of control means for controlling the magnetic recording and reproduction of information by means of the magnetic head 16. The microprocessor 40 which executes the sub-routine of FIG. 5, and the head motor driver circuit 44 constitute a positioning device for moving the magnetic head 16 radially of the magnetic disk 12 to position the magnetic head 16 with respect to the magnetic disk 12.

The operation of the magnetic recording and reproducing apparatus which has been described will be described.

Assuming that a recording or reproducing operation is effected on a selected sectoral recording track, for example, on the sectoral recording track No. 3, the magnetic head 16 is positioned on the second annular recording track of the disk 12 as counted from the outermost annular recording track. In this condition, the ODD-EVEN signal SG5 generated from the microprocessor 40 and applied to the head control circuit 46 is held in its high-level state. Therefore, the AND gates 72, 74 are held open while the output signal SG9 from the counter 66 is high, that is, while the sectoral recording track No. 3 passes the magnetic disk 16. On the contrary, the AND gates 72, 74 are held closed while the sectoral recording track No. 2 on the same second annular track of the disk 12 passes the magnetic head 16.

Described more specifically, if the ODD-EVEN signal SG5 becomes high while the sectoral recording track No. 2 passes the magnetic head 16, the AND gates 72, 74 are opened at the very moment when the beginning of the sectoral recording track No. 3 passes the magnetic head 16. Namely, the recording or reproduction of information on the sectoral recording track No. 3 is effected during the first passage of the track No. 3 past the magnetic head 16. However, if the ODD-EVEN signal SG5 becomes high while the sectoral recording tyrack No. 3 passes the magnetic head 16, the AND gates 72, 74 are opened part way through the track No. 3. In this case, therefore, the recording or reproduction is accomplished on only a part of the track No. 3. To avoid this partial recording or reproduction, the microprocessor 40 is adapted to feed the write-in signals SG4 to the head control circuit 46 or to receive the read-out signals SG3 from the circuit 46 only while the magnetic disk 12 rotates a half turn from the moment when the secondary indexing signal SG11 (INDEXING signal SG11 generated when the output signal SG9 is in a low-level state) is produced for the first time after the microprocessor 40 has applied the ODD-EVEN signal SG5 to the head control circuit 46. A similar measure is provided for avoiding partial recording or reproduction on the odd-numbered sectoral recording tracks.

Generally, the host device supplies a magnetic recording and reproducing apparatus with not only the serial track number data to designate an annular recording track of a magnetic disk (corresponding to sectoral track number data to designte a sectoral recording track of the magnetic disk 12), but also data to designate sectorial parts of the designated annular track (sub-sectors of the sectoral recording track of the magnetic disk 12), and data to designate one of a plurality of magnetic heads (16), so that information recording or reproduction may be effected on a desired part of a desired recording track on a selected surface of a selected one of the magnetic disks. Since this aspect is not important to the understanding of the present invention, no further description will be provided, and the disclosure contained in the present application is based on the assumptions that the host device designates only a sectoral recording track of the magnetic disk 12 (annular recording track of a magnetic disk in an ordinary magnetic recording and reproducing apparatus with which the host device is connectable), and that the recording or reproducing operation is effected on the entire area of the selected sectoral recording track.

In the case where the microprocessor 40 receives serial track number data to select a recordng track No. 10 for recording or reproduction of information after the recording or reproduction on the sectoral recording track No. 3 (annular recording track No. 3 as designated by the host device), the sub-routine shown in FIG. 5 will be executed by the microprocessor 40. More specifically, if the recording track No. 10 (sectoral recording track No. 10) is selected while the magnetic head 16 is positioned on the recording track No. 3 (sectoral recording track No. 3), the host device supplies the microprocessor 40 with a signal to give seven stepping pulses to drive the head feed motor 28. To this end, the microprocessor 40 executes step S1 to store in a STEP memory of the RAM 41 a numerical value "7" which represents the number "S" of the stepping pulses. Step S1 is followed by step S2 to judge whether the sectoral track number "N" of the sectoral recording track No. 3 on which the magnetic head 16 is currently positioned is even or odd. If the sectoral track number "N" is even, the microprocessor 40 goes to steps S3 and S4. In this specific example, however, the number "N" is odd and consequently step S2 is followed by step S5 to judge whether the current (value "S") of the STEP memory is off or even. If the content "S" is even, step S5 is followed by step S7. In the instant case where the current content "S" is "7", i.e., odd, step S5 is followed by step S6 wherein the content of the STEP memory is incremented. That is, the content of the STEP memory of the RAM 41 is increased to "8". Then, step S7 is executed to divide the content "8" of the STEP memory by "2". Thus, the content is reduced to "4". After the execution of the sub-routine of FIG. 5, the microprocessor 40 applies to the head motor driver circuit 44 stepping pulses whose number is equal to the current content of the STEP memory. Namely, four stepping pulses are applied to the driver circuit 44. As a result, the head feed motor 28 is operated in four steps to move the magnetic head 16 in the radial direction of the magnetic disk 12 so that the magnetic head 16 is positioned on the annular recording track which includes the sectoral recording track No. 10. Subsequently, the microprocessor 40 changes the level of the ODD-EVEN signal SG5 from high to low. The recording or reproduction of information on this sectoral recording track No. 10 may be achieved in the same manner as previously described in connection with the sectoral recording track No. 3.

As described hitherto, when a given recording track is designated with the corresponding serial track number by the host device for recording or reproduction of information on or from that designated recording track, the magnetic head 16 is positioned on one of the annular recording tracks of the magnetic disk 12 which includes the sectoral recording track indentified with the sectoral track number equal to the serial track number designated by the host device, and the information transferred from the host device is recorded or written on the selected sectoral recording track, or the information retrieved from the selected sectoral recording track is fed to the host device. Thus, the instant recording and reproducing apparatus is capable of recording or reproducing information on or from the sectoral recording track identified with the sectoral track number which is equal to the serial track number designated by the host device. It will be understood that the illustrated apparatus makes it possible to double the amount of information that can be stored in a magnetic disk, without any hardware or software modifications of the host device. For the host device, the instant apparatus operates as if the information recording and reproduction were accomplished in the same manner as an ordinary magnetic recording and reproducing apparatus wherein annular recording tracks are not equally divided into a plurality of sectoral recording tracks.

While the present invention has been described in its preferred embodiment with a certain degree of particularity, for illustrative purpose only, it is to be understood that the invention is not limited to the precise disclosure, but may be embodied with various changes, modifications and improvements which may occur to those skilled in the art. For example, each annular recording track of a magnetic disk may be equally divided into three or more sectoral recording tracks.

In the illustrated embodiment, the INDEXING signal SG11 is regarded as a primary indexing signal representative of the reference angular position (indicated at A in FIG. 1) of the magnetic disk 12 only when the INDEXing signal SG11 is accompanied with the signal SG14 from the waveform shaping circuit 60, and is regarded as a secondary indexing signal representative of the secondary index position (indicated at B in FIG. 1) when the INDEXING signal SG11 is not accompanied with the signal SG14. However, it is possible that the signal SG1, SG6 or SG14 is used as the primary indexing signal while the count-out or time-out signal from the counter 66 is used as the secondary indexing signal.

What is claimed is:

1. A boosted-capacity magnetic recording and reproducing apparatus compatible with a host device to which is connectable a standard-capacity magnetic recording and reproducing apparatus which includes (a) a first magnetic disk having a multiplicity of first annular recording tracks which are concentric with an axis of rotation of the disk and which are identified with respective serial track numbers, (b) a first disk drive for rotating the first magnetic disk about its axis of rotation at a first rate, (c) a first magnetic head, (d) a first positioning device for moving the first magnetic head radially of the first magnetic disk to position the first magnetic head on a selected one of the first annular recording tracks which is identified with the corresponding serial number designated by the host device, and (e) first control means for recording or reproducing information on or from the selected recording track through the magnetic head after the magnetic head is positioned at the selected recording track, said boosted-capacity recording and reproducing apparatus comprising:

A second magnetic disk having a multiplicity of second annular recording tracks each of which is equally divided into a plurality of sectoral recording tracks, said sectoral recording tracks being identified with respective sectoral track numbers which are equal to said serial track numbers;

a second disk drive for rotating said second magnetic disk at a second rate which is equal to said first rate divided by the number of division of each of said second annular recording tracls;

a second magnetic head;

indexing means for detecting said sectoral recording tracks of said second magnetic disk, said indexing means generating an indexing signal when each of boundaries between said sectoral recording tracks adjacent to each other in a circumferential direction of said second magnetic disk passes a predetermined position during each rotation of said second magnetic disk;

a second positioning device for moving said second magnetic head radially of the second magnetic disk to position the second magentic head on one of said second annular recording tracks which includes the sectoral recording track identified with one of said sectoral track numbers which is equal to the serial track number designated by said host device; and second control means, responsive to said indexing signal, for recording or reproducing information on or from said sectoral recording track identified with said one of the sectoral track numbers.

2. A boosted-capacity magnetic recording and reproducing apparatus according to claim 1, wherein said indexing means generates a primary indexing signal and at least one secondary indexing signal during each rotation of said second magnetic disk, said primary indexing signal representing a reference angular position of said second magnetic disk, said second control means being responsive to said primary indexing signal and said at least one secondary indexing signal, to detect the sectoral recording track identified with said one of the sectoral track numbers.

3. A boosted-capacity magnetic recording and reproducing apparatus according to claim 1, wherein said second positioning device comprises a microcomputer which, upon designation of another serial track number by said host device, calculates the number of the second annular recording tracks of the second magnetic disk, as counted from the second annular track which includes the sectoral recording track currently identified with said one of the sectoral track numbers, to the second annular track which includes the sectoral recording track which is identified next with another sectoral track number equal to said another serial track number.

4. A boosted-capacity magnetic recording and reproducing apparatus according to claim 1, wherein said indexing means generates a primary indexing signal and at least one secondary indexing signal for each rotation of said second magnetic disk, said primary indexing signal representing a reference angular position of said second magnetic disk, said second control means being responsive to said primary indexing signal and said at least one secondary indexing signal, to detect the sectoral recording track identified with said one of the sectoral track numbers, said second positioning device comprising a microcomputer which, upon designation of another serial track number by said host device, calculates the number of the second annular recording tracks of the second magnetic disk, as counted from the second annular track which includes the sectoral recording track currently identified with said one of the sectoral track numbers, to the second annular track which includes the sectoral recording track which is identified next with another sectoral track number equal to said another serial track number.

5. A boosted-capacity magnetic recording and reproducing apparatus according to claim 1, wherein said each second annular recording track of said second magnetic disk is equally divided into two sectoral recording tracks, and said indexing means comprises first indexing means including an indexing portion rotated together with said second magnetic disk, and an indexing sensor which generates a primary indexing signal upon detection of said indexing portion, said indexing means further comprising second indexing means including a timer which measures a time necessary for said second magnetic disk to rotate by a half turn after the generation of said primary indexing signal, said timer generating a secondary indexing signal when said time has lapsed.

6. A boosted-capacity magnetic recording and reproducing apparatus according to claim 1, wherein said each second annular recording track of said second magnetic disk is equally divided into two sectoral recording tracks, and said indexing means comprises:

an indexing portion which is rotated together with said second magnetic disk;

an indexing sensor which generates a detection signal upon detection of said indexing portion;

a time-interval counter which starts counting the number of clock pulses when said detection signal is generated, and which generates a time-out signal when a count thereof has reached a predetermined number which corresponds to a half turn of said second magnetic disk;

a mono-multivibrator connected to said indexing sensor and said time-interval counter, and applying, as said indexing signal, a pulse signal of a predetermined pulse width to said second control means, when the mono-multivibrator receives each of said detection signal and said time-out signal; and means for applying another pulse signal to said second control means when said detection signal is generated, said second control means judging that said indexing signal received together with said another pulse signal is a primary indexing signal which represents a reference angular position of said second magnetic disk.

7. A boosted-capacity magnetic recording and reproducing apparatus according to claim 1, wherein said each second annular recording track of said second magnetic disk is equally divided into two sectoral recording tracks, and said second control means comprises:

a microprocessor;

a gate circuit connected between said microprocessor and said second magnetic head; and means for producing a first odd-even signal which has different signal levels depending upon whether the sectoral track number of the sectoral recording track on which said second magnetic head is currently positioned is odd or even, said mircoprocessor generating a second odd-even signal which has different signal levels depending upon whether the serial track number designated by said host device is odd or even, said gate circuit being open when both of the sectoral track number and the serial track number represented by said first and second odd-even signals are odd or even.

8. A boosted-capacity magnetic recording and reproducing apparatus according to claim 7, wherein said microprocessor permits magnetic recording or reproduction of information during a time duration between a moment when said indexing means generates the indexing signal indicative of a beginning of the sectoral recording track identified with said one of the sectoral track numbers which is equal to the serial track number designated by said host device, and a moment when said indexing means generates the next indexing signal.

9. A boosted-capacity magnetic recording and reproducing apparatus according to claim 8, wherein said indexing means generates one primary indexing signal and one secondary indexing signal during each rotation of said second magnetic disk, said primary indexing signal indicating a beginning of one of said two sectoral recording track of said each second annular recording track, and said secondary indexing signal indicating a beginning of the other of said two sectoral recording tracks, said microprocessor being responsive to said primary and secondary indexing signals to judge whether said second magnetic head is currently positioned on the sectoral recording track identified with said one of the sectoral track numbers.

* * * * *